United States Patent [19]
Trouiller

[11] 3,978,939
[45] Sept. 7, 1976

[54] ACOUSTIC WELL LOGGING METHODS AND APPARATUS

[75] Inventor: Jean-Claude Trouiller, Chaville, France

[73] Assignee: Schlumberger Technology Corporation, New York, N.Y.

[22] Filed: July 5, 1974

[21] Appl. No.: 486,076

Related U.S. Application Data

[63] Continuation of Ser. No. 256,075, May 23, 1972, abandoned.

[30] Foreign Application Priority Data

May 24, 1971 France .............................. 71.18638

[52] U.S. Cl. ................................ 181/104; 181/106; 340/15.5 BH; 250/268
[51] Int. Cl.² ...................... G01V 1/40; G01V 1/02
[58] Field of Search ............ 340/55, 18 R, 15.5 SW, 340/15.5 BH, 8 C; 181/15, 104, 106; 73/189, 152; 250/268; 33/302; 310/8.2, 9.1, 9.5

[56] References Cited
UNITED STATES PATENTS

| | | | |
|---|---|---|---|
| 2,595,241 | 5/1952 | Goble | 181/.5 |
| 2,631,270 | 3/1953 | Goble | 181/104 |
| 3,126,976 | 3/1964 | Cordall et al. | 181/106 |
| 3,376,950 | 4/1968 | Grine | 340/15.5 SW |
| 3,434,568 | 3/1969 | Caldwell | 181/.5 |
| 3,811,529 | 5/1974 | Crawford | 310/9.1 |

OTHER PUBLICATIONS

Jergen, "The Physical . . . in Cylindrical Coordinates," 1/53, pp. 40–47, Journ. Acoust. Soc. Amer. vol. 25, No. 1.
Jergen, "The Effect of a Surrounding Fluid . . . Elastic Tube," 6/55, pp. 227–231, Jour. Appl. Mech., vol. 22, No. 2.

*Primary Examiner*—Nelson Moskowitz
*Attorney, Agent, or Firm*—Brunbaugh, Graves, Donohue & Raymond

[57] ABSTRACT

In accordance with an illustrative embodiment of the present invention, an acoustic logging transducer array includes cylindrical transmitter and receiver transducers whose axes are aligned perpendicular to the longitudinal axis of a longitudinally extending support member in a borehole. The transducers are eccentered in the borehole with the receiving transducers mounted in a pad member which is supported near the borehole wall.

23 Claims, 17 Drawing Figures

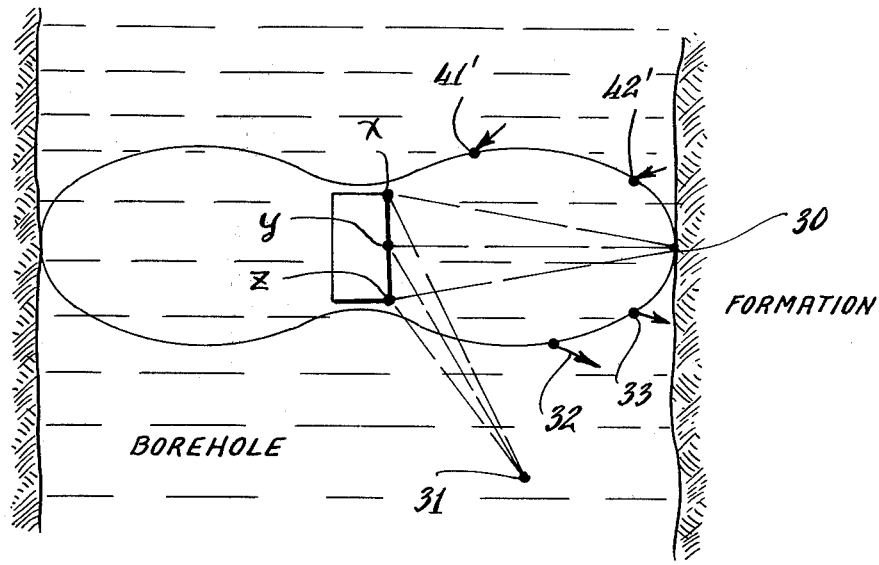
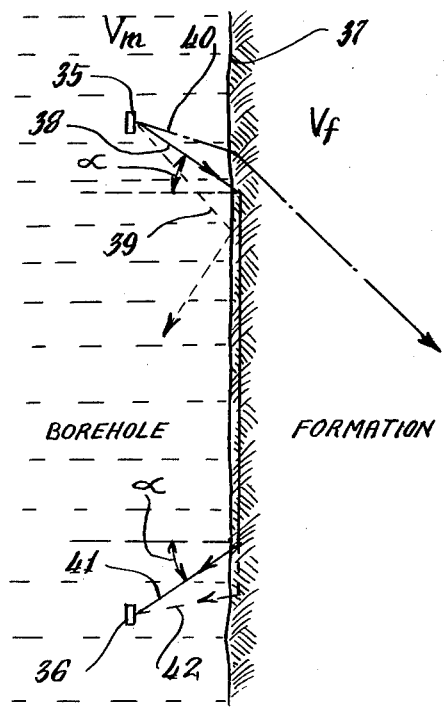
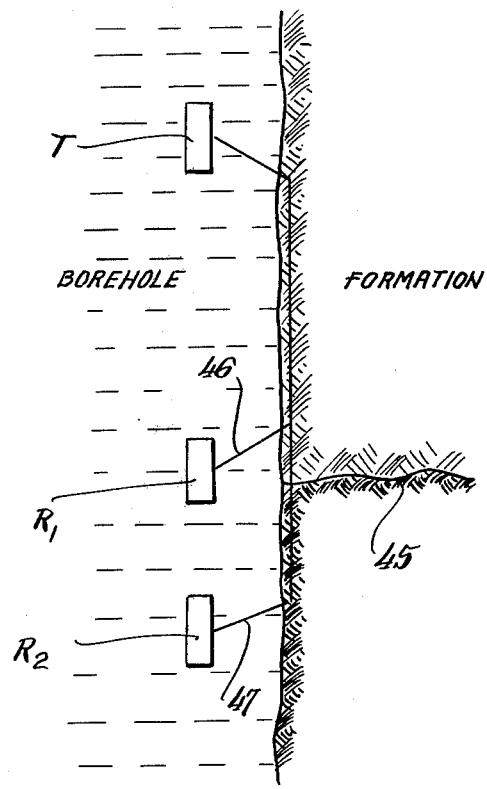

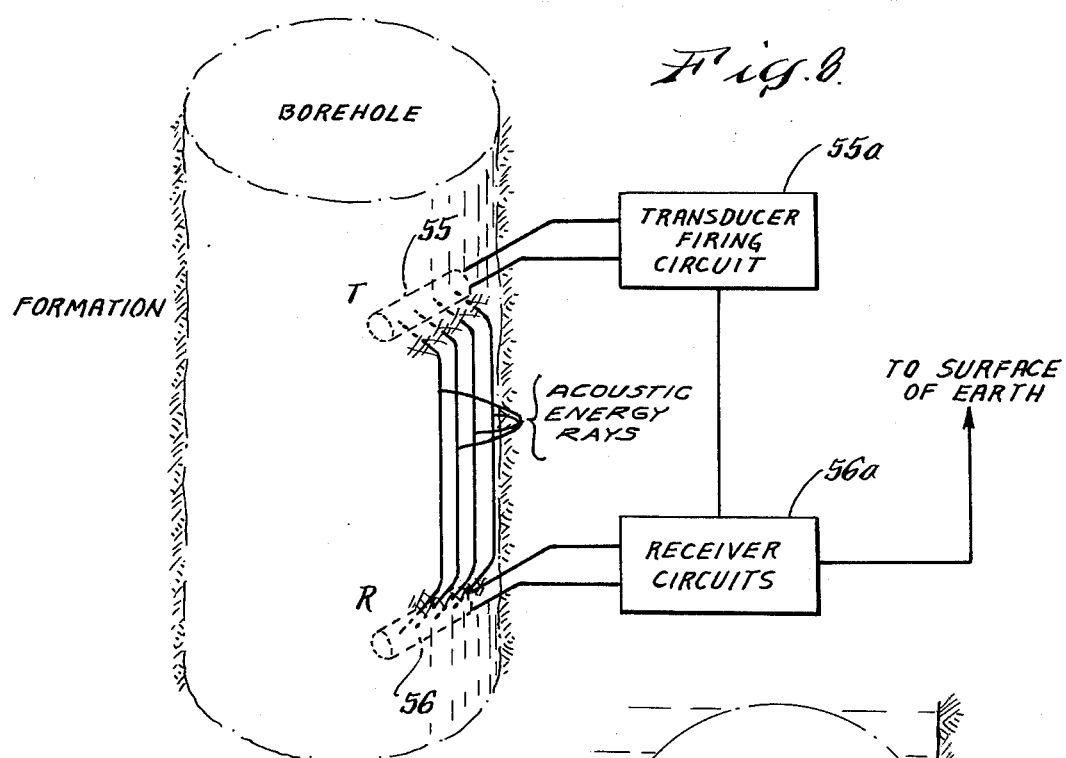

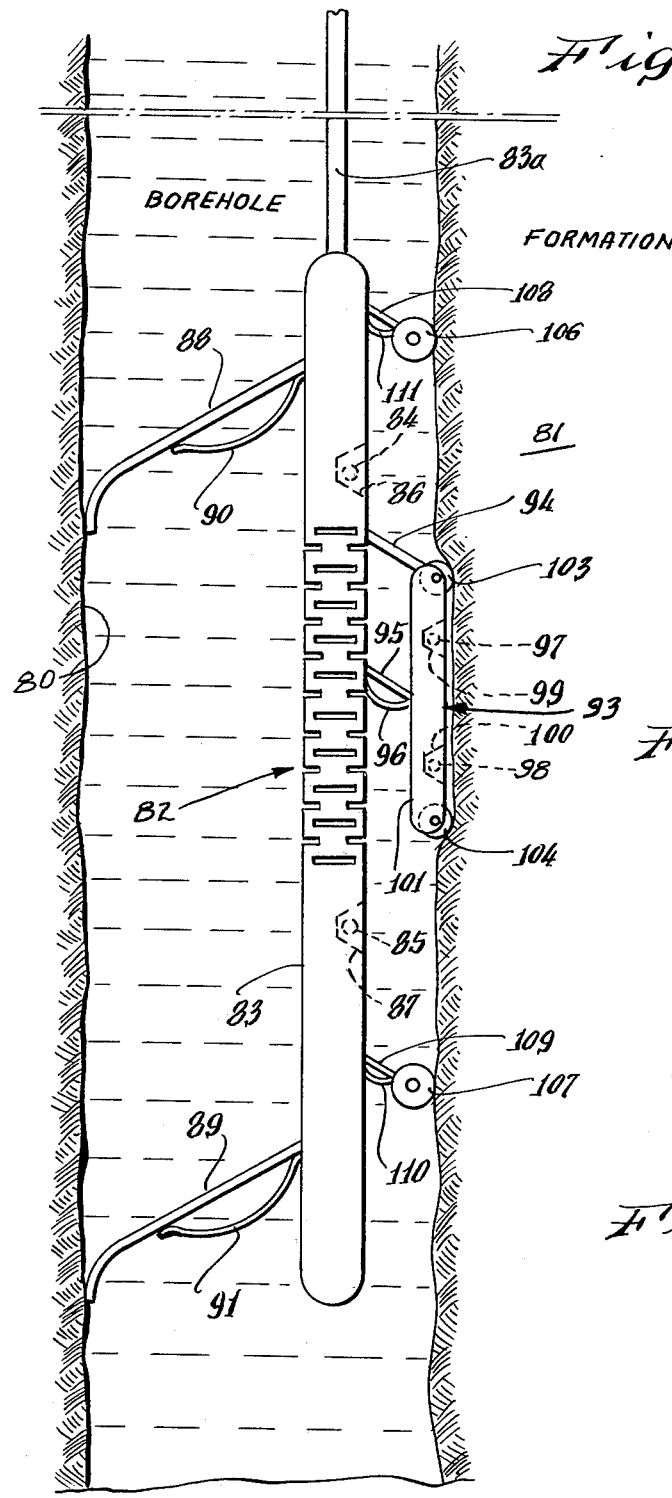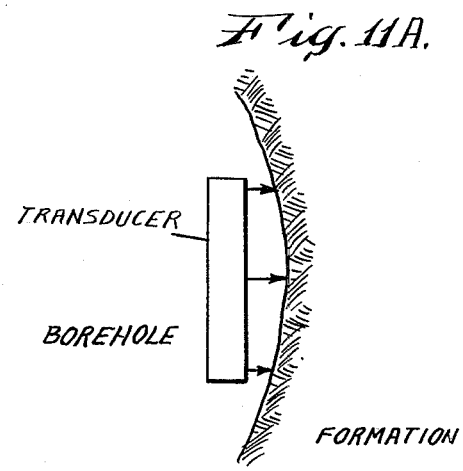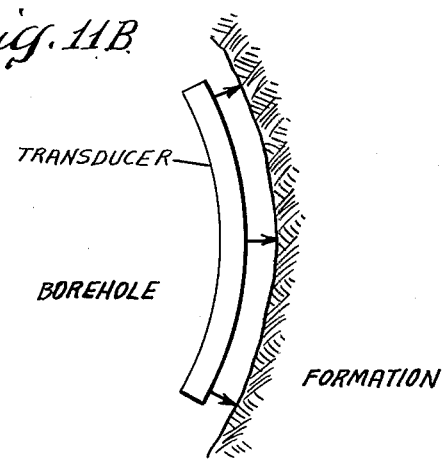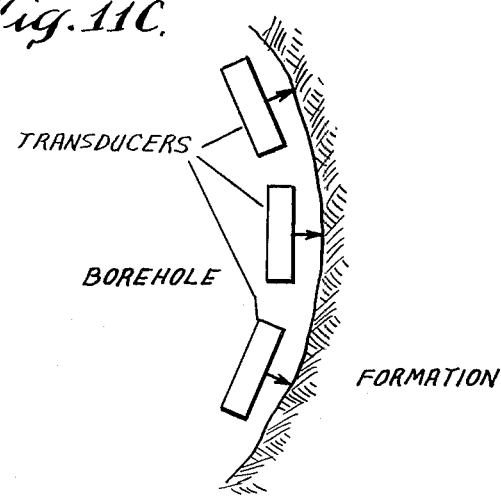

ACOUSTIC WELL LOGGING METHODS AND APPARATUS

This is a continuation of application Ser. No. 256,075 filed May 23, 1972, now abandoned.

BACKGROUND OF THE INVENTION

This invention relates to improvements in acoustic well logging methods and apparatus and more particularly to improvements in techniques for transmitting and receiving acousitc energy in a borehole.

In acousitc well logging apparatus presently in use, a longitudinally extending support member carrying a plurality of acoustic transmitters and receivers is supported by a cable in the borehole for movement therethrough to investigate the surrounding earth formations. In the past, the support member has been centered in the borehole with transducers spaced apart along its length. In this case, the transducers have been of the cylindrical type with their axes aligned along the longitudinally extending axis of the support member which carries them. In one type of measuring system, a transducer emits acoustic energy into the borehole for passage through the formation to a pair of nearby acoustic reeceiver transducers to enable a measurement of the acoustic travel time between the two receivers. In another type of system, the amplitude difference or ratio between selected half cycles of the signals respectively produced by the two receivers is measured. In still another type of system, the waveform of the signal produced by one receiver is displayed or recorded for subsequent analysis or processing.

While the centered acoustic well logging devices have generally provided good results, they nevertheless suffer from a number of inherent disadvantages. For example, they are very sensitive to the positioning of the support member in the borehole. Thus, a tilted support member would create a situation where the travel time to one receiver transducer would be different from that to the other receiver thus creating a measurement error. This problem can be alleviated to a great extent by the use of compensation techniques of the type shown in U.S. Pat. Nos. 3,257,639 granted to F. P. Kokesh on June 21, 1966, or 3,207,256 granted to R. B. Blizard on Sept. 21, 1965.

In addition to tilting of the support member, it can be offcentered in the borehole thus causing in the reception signal a waveform distortion and an amplitude diminution because of elementary acoustic rays arriving out of phase at different circumferential points of each individual receiver transducer. It is possible, under certain formation conditions, that the resulting signal so produced by the receiver will be distorted and attenuated to the point that accurate determination of the time of arrival of acoustic energy at such receiver is not possible. This phase distortion caused by offcentering of the support member in the borehole can be compensated for by mounting at least the receivers in a pad designed to be applied against the borehole wall and in some cases shielding the back or non-borehole wall engaging side of the pad from acoustic energy. A pad mounted acoustic logging device can be found in U.S. Pat. No. 3,406,776 granted to L. Henry on Oct. 22, 1968 or U.S. Pat. No. 3,542,150 granted to A. H. Youmans et al. on Nov. 24, 1970.

Even when the acoustic transducers are mounted on a borehole wall engaging pad member, it has been found that the phase distortion of the emitted or received elementary acoustic rays can produce an appreciable error in the resulting measurement. As a matter of fact, as the transducers have a significant relative dimension versus the acoustic wave length normally used, the form of the signal produced at a receiver will be dependent on the phase difference of elementary waves, and therefore on factors other than the formation parameter which is to be measured. For example, if acousitc travel time is to be measured, such phase distortion of elementary acoustic waves may cause the amplitude of the half cycle usually selected for measurement to be less than the detection threshold, thus altering the measured travel time. (In making acoustic travel time measurements, a detection threshold is used to prevent the erroneous detection of noise.)

It is therefore an object of the present invention to provide new and improved methods and apparatus for transmitting and/or receiving acoustic energy in a borehole.

It is another object of the present invention to provide new acoustic well logging methods and apparatus wherein one or more acoustic transducers are constructed and arranged in an acoustic well logging apparatus in a manner which minimizes waveform distortion and amplitude diminution of the received signal.

In accordance with the apparatus features of the present invention, an acoustic transducer means is located in a longitudinally extending support member or in a pad member adapted for movement through a borehole. When in the borehole, the support member supports the transducer means whether it is in the pad or support member. The transducer means is supported near a portion of a borehole wall and is arranged such that the surface of the transducer means defines a curved line along a plane which extends longitudinally and radially with respect to the longitudinal axis of the support or pad member (that axis which is supposed to be parallel to the longitudinal axis of the borehole) to produce a substantially semi-circular radiation pattern over a selected portion of the region surrounding the transducer means.

In accordance with the method features of the present invention, acoustic energy is emitted at a first location in a borehole and a portion of the emitted energy received at a second location spaced from the first location to produce an electrical signal representative of the received energy. The emitted energy has a substantially semi-circular radiation pattern over a selected region surrounding the first location so that the produced electrical signal will be relatively unaffected by the particular value of the limit refraction angle for acoustic energy entering or leaving the borehole.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

FIG. 4 is a typical radiation directivity pattern of an acoustic transducer of the type illustrated in FIG. 1;

FIG. 5 illustrates how emitted acoustic energy behaves at the borehole wall—formation interface;

FIG. 7 is a representative example of the operation of the FIG. 1 system;

FIG. 8 is a representative embodiment of an acoustic transducer array constructed and arranged in accordance with the present invention;

FIG. 9 is another embodiment of the present invention useful for explaining certain advantages of the present invention;

FIGS. 11A, 11B and 11C are alternative embodiments of the present invention;

FIG. 12 is a representation of the arrangement of transducers in accordance with the present invention;

FIG. 13 is a view from FIG. 12 of a transducer and its supporting structure.

DETAILED DESCRIPTION OF THE PREFERRED EMBODIMENTS

Figure 1:
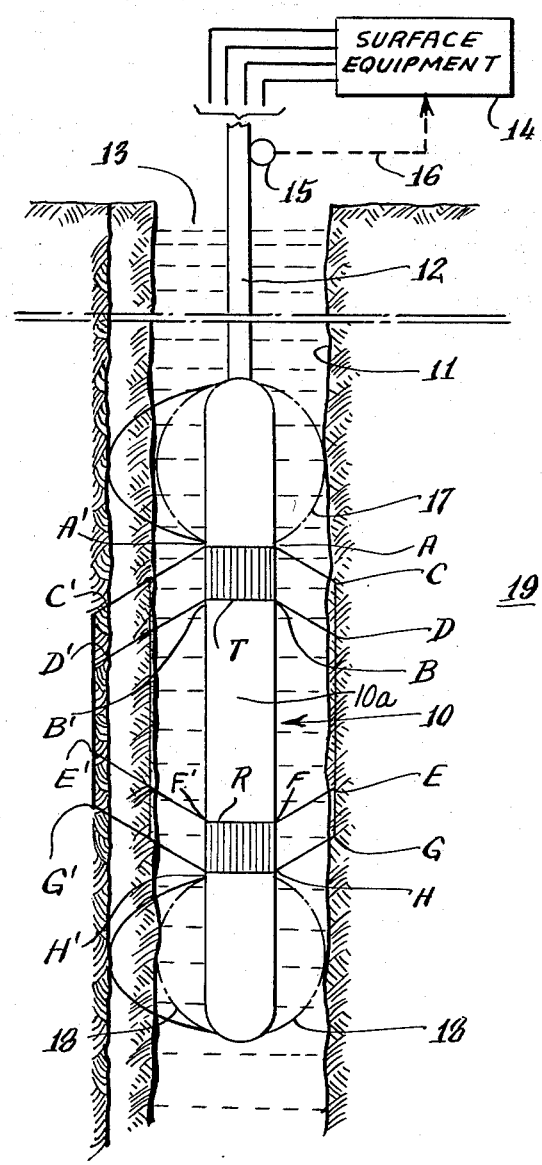
FIG. 1 shows a prior art acoustic logging system.

Referring to FIG. 1, there is shown a prior-art investigating apparatus 10 supported in a borehole 11 by a cable 12. The borehole is filled with a drilling mud 13. The cable 12 is reeled and unreeled by a suitable drum and winch mechanism (not shown) for raising and lowering the investigating apparatus 10 through the borehole 11. The conductors which pass through the cable 12 are connected via a suitable slip ring arrangement (not shown) to suitable surface equipment 14 which processes the data and records them as a function of depth. Depth information is supplied to the equipment 14 via a mechanical linkage 16 which is driven by a wheel 15 which engages the cable 12. The downhole investigating apparatus 10 includes an elongated central support member 10a on which are mounted transmitter T and an acoustic receiver R as well as springs 17 and 18 which locate the support member 10a in the borehole. The investigating apparatus 10 also includes suitable electronic circuitry for energizing the acoustic transmitter T to emit acoustic energy into the adjoining formations 19 and for enabling the receiver R to produce an electrical signal representative of the acoustic energy which impinges on the receiver R for transmission to the surface of the earth.

The acoustic energy emitted and received by acoustic transducers is resultant of an infinite number of elementary waves. One way of analyzing the emission and reception of energy by acoustic transducers is to consider the elementary areas of such transducers and the elementary rays of energy which are transmitted or received. In FIG. 1 there are shown (on the right-hand side of the investigating apparatus 10) elementary areas A and B of transmitter T and elementary areas F and H of receiver R. An elementary ray emitted from the elementary area A will travel the path A - C - D - E - G - H to the elementary area H and the path A - C - D - E - F to the area F. An elementary ray emitted from the elementary area B of transmitter T will follow the path B - D - E - F to the elementary area F and the path B - D - E - G - H to the area H of the receiver R. By inspection it can be seen that the energy which takes the path A - C - D - E - G - H will travel a path substantially longer than the energy which travels the path B - D - E - F thus causing phase distortion.

Figure 2A:
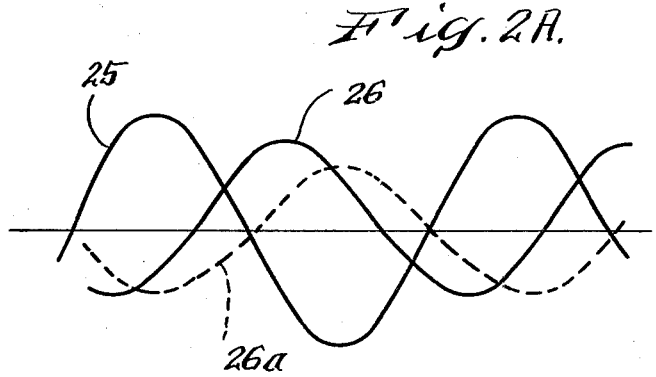
FIGS. 2A and 2B are waveforms of signals which could be expected to be produced from an acoustic receiver in the FIG. 1 system.
Figure 2B:
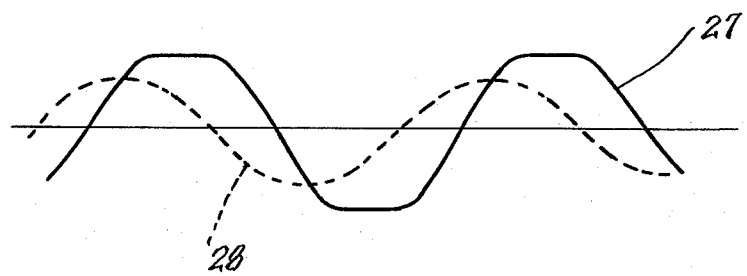

To understand how this phase distortion occurs, refer to FIG. 2a and assume that the wave form of the energy arriving at the elementary area F of the receiver R which has travelled the path B - D - E - F is as represented by the wave form 25 in FIG. 2a. Furthermore, assume that the wave form of the received signal produced by the receiver R resulting from energy which has travelled the path A - C - D - E - G - H is as represented by the wave form 26 in FIG. 2a. Then as shown by resultant wave form 27 in FIG. 2b, the resulting wave form produced by the summation of elementary wave forms 25 and 26 will be distorted. The amount of phase displacement and amplitude difference between the wave forms 25 and 26 will depend on the wave length of the acoustic energy in the formation. The dimensions of the wave length are dependent, among other things, on the properties of the medium through which the acoustic energy passes. In the FIG. 1 example, the energy which travels the path A - C - D - E - G - H must travel a distance C - D plus E - G greater than the energy which travels the path B - D - E - F. If this difference interval is much smaller than one wave length, the phase difference between the elementary signals produced by the two elementary waves will be relatively small, thus causing little distortion. On the other hand, if the wave length is small compared to this difference interval, the wave form corresponding to the path A - C - D - E - G - H may be phase-shifted by 180° as represented by the wave form 26a in FIG. 2a to give the resultant wave form 28 in FIG. 2b. Of course, to obtain a true representation of the wave form produced by the receiver R resulting from energy emitted by the transmitter T, every elementary area of both the transmitter T and the receiver R must be taken into consideration.

In addition to the above-discussed causes of phase distortion, it can also occur because of eccentering of the investigating apparatus in the borehole. This situation is illustrated in FIG. 1 where the investigation apparatus 10 is closer to one side of the borehole than the other. The paths for travel of acoustic energy on the left-hand side of the investigating apparatus 10 in FIG. 1 are greater than those for the right-hand side thereof. Thus, the path from elementary area A' to elementary area H' is greater than the path from A to H. Likewise, the path from B' to F' is greater than the path from B to F. From the above discussion of how the wave forms corresponding to the elementary rays of energy are combined, it can be seen that the energy emitted and received on the left-hand side of the investigating apparatus will arrive slightly later than the energy received on the right-hand side of the receiver R, thus causing phase distortion.

Figure 3:
FIG. 3 is another example of prior acoustic logging apparatus.

It would appear that the eccentering problem can be overcome by locating at least the receivers on a pad which engages the borehole wall and shielding the rear side of the pad. It would also appear that the phase distortion resulting from the difference in th acoustic path lengths could be minimized by shortening the length of the transducers. As an alternative to shortening the length of the transducers (which causes a decrease in efficiency), the transducers could be tilted as shown in FIG. 3 to even out the ray lengths. Unfortunately, a significant amount of wave form distortion and amplitude diminution was found to exist even with these solutions.

Turning now to FIGS. 3, 4, 5 6A–6B and 7, the reasons discovered by applicant for the unsatisfactory performance of prior art acoustic transducers will be discussed.

Referring first to FIG. 4, there is shown a typical radiation directivity pattern for a longitudinally extending cylindrical transducer. The exact shape of the directivity pattern will depend on the dimensions of the transducer and the wave length of the acoustic energy in the medium surrounding the transducer. The shorter the wave length and/or the longer the length of the transducer, the more pancake-shaped will be the directivity pattern. Besides, as the acoustic energy emitted from a downhole investigating apparatus is usually a pulsed energy, it includes a large spectrum of frequencies, so there will be many directivity patterns associated with any given transducer. This, of course, has to be considered for determining the global distortion of the resultant signal produced by a receiver in such a prior art system.

One way of explaining this phase distortion, for any given frequency is to examine the summation of individual energy rays emitted from individual elementary areas at points located in any given direction from a transducer. Thus, in FIG. 4, at the point 30, the elementary energies emanating from the three elementary X, Y and Z of the cylindrical trasmitter will be substantially in phase so that the resultant signal is maximum in that direction. However, at the point 31, it can be seen that the elementary waves from elementary areas X, Y and Z will be more heavily phase-shifted relative to each other than was the case for point 30. It is this phase-shifting of elementary waves relative to one another that results in the lower resultant energy in the direction of point 31. The same analysis would apply to acoustic transducers operating in the receiving mode. From FIG. 4, it can be seen that the direction of emission or reception of energy becomes very important as concerns the total energy radiated and the amount of phase distortion. It will now be shown why this is important.

Turning to FIG. 5, there is shown an elementary area 35 of an acoustic transmitter and an elementary area 36 of an acoustic receiver. Energy will propagate from the elementary area 35 in all directions towards a borehole wall 37. There is one angle for energy impinging on the borehole wall for which a maximum amount of energy refracted into the fromation will travel through the formation along the borehole wall. This incidence angle is called the limit refraction angle designated $\alpha$, such that $\sin \alpha = V_m/V_f$ where $V_m$ is the acoustic velocity of the mud and $V_f$ is the acoustic velocity of the formation. The particular energy ray in FIG. 5 which has an incidence angle of $\alpha$ is the ray designated 38. For energy rays having an incidence angle greater than $\alpha$, such as the ray 39, a significant portion of the acoustic energy will be reflected from the borehole wall towards the downhole investigating apparatus. Since the velocity of sound is greater in the formation than in the mud and the investigating apparatus is constructed to delay and attenuate acoustic energy, such reflected energy is not detrimental to the particular measurement to be made. For energy rays having an incidence angle less than $\alpha$, most of the energy will be refracted into the formation as represented by the ray 40 in FIG. 5. Of course, a small amount of the energy from the ray 40 will eventually find its way to the receiver. It will normally be attenuated and delayed to such an extent as to be negligible in determining the shape of at least the initial few half cycles of the wave form of the electrical signal produced by the receiver.

It was the recognition of the combined effect of the radiation pattern of FIG. 4 coupled with the situation of FIG. 3 that lead to the discovery of the reason for undesirable performance of prior art transducers. Thus as $V_f$ (or $V_m$) changes, the amount of phase distortion and energy transferred from the transmitter to receiver through the formation will vary to an undesirable extent. For example, in FIG. 4, (considering energy emitted from just the elementary area Y), a limit refraction angle $\alpha$ which causes the energy ray 32, will cause substantially more distortion and less energy to arrive at the receiver than would be the case for energy ray 33. This problem is compounded by the fact that the radiation pattern will be different for different frequencies. Since emitted acoustic energy has many frequencies, this becomes another source of distortion.

The above discussion has been concerned with the transmitter. It should however be noted that the same effect takes place at the receiver, i.e., the maximum energy directed at the receiver results from that elementary wave which passes to the receiver at an angle $\alpha$ relative to the energy propagating through the formation along the borehole wall, and the receiver radiation pattern will effectively weight energy from one direction more than another. The effects of the transmitter and receiver are cumulative.

It should also be noted that there may be several elementary rays of significant energy passing along significantly different paths which strike the elementary receiver 36. For example, in FIG. 5, the elementary energy wave 41 will have significantly more energy than the ray 42 because the ray 41 is refracted from the formation at the limit refraction angle $\alpha$. However, as shown in FIG. 5, for a smooth borehole wall, by the arrows 41 and 42, the receiver will weight the ray 42 much more than the ray 41 because of the directions at which they strike the receiver. Since one effect offsets the other, both waves may produce the same overall effect at the receiver, thus causing a significant amount of phase distortion.

Figure 6A:
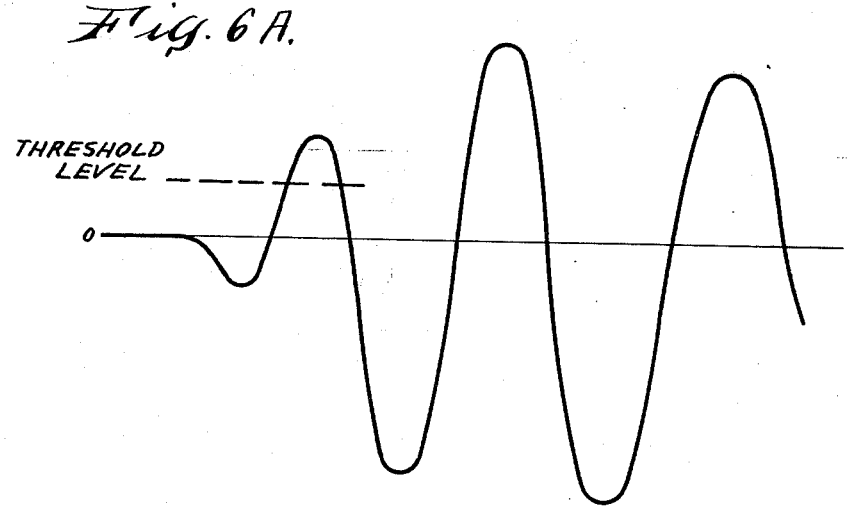
FIGS. 6A and 6B are more waveforms of signals which one might expect form apparatus of the type shown in FIG. 1.
Figure 6B:
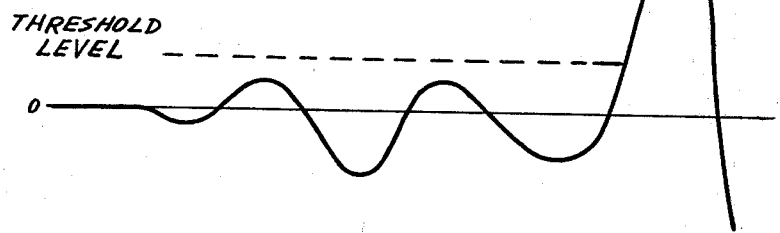

The cumulative effects of all of the above-discussed factors which lead to phase distortion between the elementary waves can produce disastrous results to the wave form of the electrical signal produced by the acoustic receiver. If conditions are completely favorable, a wave shape such as shown in FIG. 6a may be produced by the acoustic receiver of an acoustic investigating apparatus. If on the other hand downhole conditions are not so favorable (i.e., a significant amount of distortion coupled with a great amount of attenuation in the formation), a wave form such as shown in FIG. 6b may result. As discussed earlier when measuring the acoustic travel time of a formation, it is usually the case that the time of arrival of a selected half-cycle of the acoustic energy at the receiver is detected and utilized in making the travel time measurement. Because there may be a significant amount of acoustic noise, it becomes necessary to set a threshold level for the detection of acoustic energy so as to ensure that noise does not erroneously trigger the detection circuits. If detection is made on the first positive half-cycle of the received signal, the threshold level may be set as represented by the dashed line in FIG. 6a. However, as seen in FIG. 6b, the first positive half-cycle of a distorted signal may have insufficient amplitude to exceed the threshold level thus causing erroneous measurement of the formation acoustic travel time.

In addition to the adverse effects of phase distortion on travel time measurements, there are also adverse effects produced by such phase distortion when making acoustic attenuation measurements or when recording the acoustic wave form. When making acoustic attenuation measurements, it has been discovered that results may be especially bad when crossing a bed boundary. This can be seen by referring to FIG. 7 where there is shown an acoustic transmitter T and two acoustic receivers $R_1$ and $R_2$ which straddle a bed boundary 45. If the acoustic velocities of the formations on either side of the boundary 45 are substantially different, the limit refraction angles will likewise be substantially different. Such a case is depicted by the energy waves 46 and 47 which emanate from the formations at different angles. Because of the shape of the radiation directivity pattern shown in FIG. 4, the difference between the maximum energy received by the two receivers $R_1$ and $R_2$ will be a significant function of the directivity pattern of each receiver instead of simply the attenuation of acoustic energy in the formation.

Some of the above problems can be alleviated to some extent by tilting the transmitter and receiver as shown in FIG. 3. By so doing, the elementary waves which are emitted and received by the portions of the transmitter and receiver closest to one another will be delayed because of the tilt of the acoustic transducers. Such an acoustic array will produce accurate results for only one ratio of formation acoustic velocity to mud acoustic velocity. To produce reasonable results for all conditions, the positioning of the transmitter and receiver must be adjustable and the value of acoustic velocity in the formation must be known before making the adjustment. Both are difficult to accomplish.

Knowing the reasons why prior art systems did not always operate as desired, the solution to the problem will now be discussed. It is the purpose of the present invention to provide a transducer array which enables the production by an acoustic receiver of a relatively clean and distortion-free waveform for at least the initial 3 half-cycles for substantially all downhole conditions. In accordance with the present invention, this is accomplished by providing an acoustic transducer (transmitter, receiver, or preferably both) adapted to be supported by an elongated support member near a portion of a borehole wall with a section of the transducer surface defining a curved line along a plane extending longitudinally and radially with reference to the longitudinally extending support member. By so doing, the transducer has a circular-arched radiation pattern over at least one portion of the region surrounding the transducer. In a preferred embodiment of the invention, this is accomplished by aligning the axis of a cylindrical transducer perpendicular to the central axis of the support member thereby creating an omnidirectional or circular pattern and, at the same time, enabling, for each transducer, a significant transducer surface facing the direction of interest which improves the efficiency of the system. Such a cylindrical transducer will produce a circle when the above described central plane cuts the transducer perpendicular to the longitudinal axis thereof. An example of such an embodiment is shown in FIG. 8

In FIG. 8, a transmitter 55 is energized by a transmitter firing circuit 55a to emit acoustic energy which passes into the formation, then through the formation and subsequently to a cylindrical acoustic receiver 56. Suitable receiver circuits 56A receive the resulting electrical signal from the transducer 56 and process it in a known manner of transmission to the surface of the earth. As will be explained later, the particular values of the acoustic velocity of the mud and formation make little difference to the performance of the acoustic transducer array illustrated in FIG. 8. In substantially all cases, the wave form of the signal produced by the acoustic receiver 56 will be relatively clean and distortion-free regardless of most downhole conditions.

Now referring to FIG. 9, there is shown in cross-section view an acoustic transducer array comprising a transmitting transducer 60 and two nearby receiving transducers 61 and 62. The transducers 60, 61 and 62 are all constructed and arranged in accordance with the present invention. The radiation directivity pattern for the transducer 60 is represented by the dashed line 63 which, as can be seen, is circular. In other words, the directivity pattern is such that, at equal distances from the central axis of the cylindrical transducer 60, the phase and peak amplitude of the acoustic energy will be substantially the same. With a cylindrical transducer, the directivity pattern in any plane perpenicular to its symmetry axis will be circular for all frequencies of the emitted spectrum thus eliminating an important source of distortion. Although not shown in FIG. 9, the receivers 61 and 62 of course have the same radiation directivity pattern as the transmitter.

When considering a cylindrical transducer, the energy radiated therefrom in any given radial direction can be considered for all practical purposes as coming from the center axis of the transducer as represented by the energy rays 64, 65 and 66 in FIG. 9. Because the radiation directivity pattern is circular, substantially the same amount of energy is radiated in all the directions of interest and for that reason the acoustic energy which penetrates the formation at the limit refraction angle has the same amplitude regardless of the value of the incidence angle. Therefore, the problems discussed earlier in connection with FIGS. 1 through 7 will be essentially non existent when utilizing an acoustic transmitting transducer arranged in accordance with the present invention. The same thing applies to the acoustic receivers 61 and 62. Thus, in FIG. 9, the response of the cylindrically shaped perpendicular aligned acoustic receivers 61 and 62 is not dependent on the direction form which energy emanates from the formation. In other words, changes in the limit refraction angle will not alter the response of the receiving transducers 61 and 62 to the energy which strikes them.

For comparison with the situation depicted in FIG. 7, the receivers 61 and 62 are located adjacent to separate formations having different acoustic velocities. It will be recalled in the FIG. 7 situation that erroneous results could be obtained using prior-art transducers when the two acoustic receivers were adjacent to different formations. However, when utilizing the techniques of the present invention, erroneous results will not be obtained in such a situation. Thus, in FIG. 9, the limit refraction angle for the upper formation of velocity $V_{f1}$ is such as to produce the energy ray 67 and that for the lower formation of velocity $V_{f2}$ is such as to produce the ray 68. Since the radiation directivity pattern is circular for both acoustic receivers, it is clear that the particular value of the limit refraction angle will not produce the undesirable results found in the FIG. 7 situation because the response of each receiver to the energy is not dependent on this angle.

Figure 10:
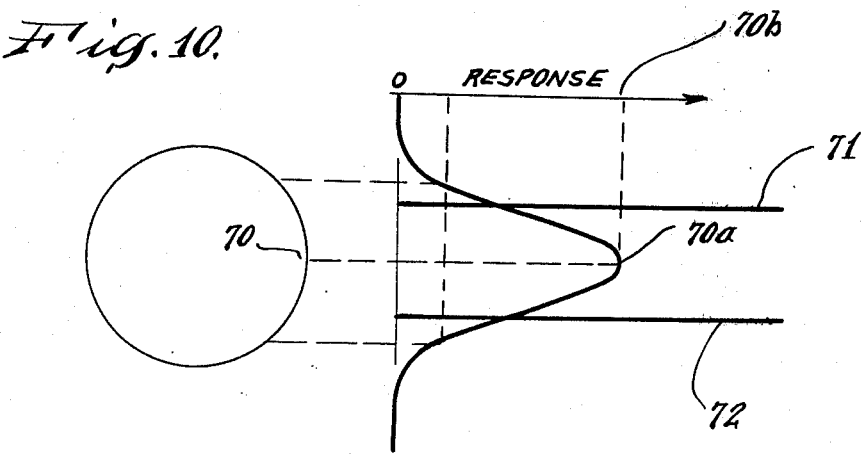
FIG. 10 illustrates the response curve for a transducer of FIGS. 8 or 9.

The receivers 61 and 62 can be considered to be responsive mostly to energy which is directed towards the center axis of the transducer. Why this is so can be better seen by reference to FIG. 10 where there is shown a cross-section of a cylindrical transducer on the left and its response curve on the right. Thus, energy striking the surface of the transducer at the point 70 will produce a response in accordance with the response value given by the projection of the point 70 onto the response curve at point 70a and from there to point 70b on the response axis. The same thing can be said for any other point on the circumference of the transducer. To determine the total response of the transducer to acoustic energy impinging on the circumference thereof at any given time, the amount of energy striking the transducer at each circumferential point is weighted in accordance with the response curve. Ths summation of these individual weighted values is then taken to produce the final value of the electrical energy produced by the transducer. Thus, it can be seem that the acoustic receivers 61 and 62 will be primarily responsive to a very thin slice of formation. Thus, in FIG. 10, 90% of the amplitude of the electrical signal produced by the receiver will be produced by energy which strikes the transducer within the area defined by the two lines 71 and 72.

The above discussion has been concerned only with energy which passes from the formation into the borehole at the limit refraction angle such that all of the elementary energy rays will be parallel to one another.

The discussion thus far also considered the effect of acoustic transducers in a borehole having a smooth wall. Unfortunately, in reality borehole walls are usually caved or rugose to some extent. This being the case, it can be appreciated that there may be more than one limit refraction angle for a transducer at any given time. It has been discovered that if the transducer is spaced at a relatively great distance from the borehole wall, there is a greater likelihood of finding more than one limit refraction angle along the borehole wall. Thus, it has been found desirable to locate the acoustic transducers, both transmitter and receiver, relatively close to the borehole wall. Moreover, to make the system less senstive to borehole rugosity, it has been thought desirable to have the receiver diameter nearly as large as the transmitter in order to enlarge the width of the sensitivity curve of FIG. 10, thereby averaging the amplitudes and phases of acoustic waves leaving an enlarged slice of formation. However, this is not convenient, first because the room for the receiver in the pad is rather small and second because with such a large receiver, phase distortions appear again and the generated signal has a lower amplitude and larger pseudo-period, whereby the accuracy of the Δt measurement is decreased. Besides, its resolution in the depth domain will be lessened. Moreover, as far as the diameter of the transmitter is concerned, its value, in case of a piezoelectric device, is determined by the main or center frequency to be emitted. So far a main frequency of 25 KHz, the transmitter diameter is 5 cm and for a main frequency of 50 KHz, it would be 2.5 cm.

There is one other possible source of error which should be discussed at this time. Since the borehole wall is curved, the distance between a cylindrical transducer and the borehole wall will not be the same for points along a given longitudinal axis on the outer circumference of the transducer, thus leading to some phase distortion. This situation is depicted in FIG. 11A. If the wave length is substantially greater than this difference in length, any resulting error would be negligible. However, if it became important, the transducer could be constructed and arranged as shown in FIG. 11B. The transducer of FIG. 11B has a semi-toroidal shape with the cylindrical transducer bent to conform to the curvature of the borehole wall. It can be seen that, in this case, the situation depicted in FIG. 11A will not be a problem. Another solution would be to position a plurality of cylindrical transducer segments of small longitudinal extent as shown in FIG. 11C. The electrical connection to these segments from the electrical circuitry would be in parallel fashion for the transmitters thus increasing the emitted energy, and in a series connection for the receivers thus increasing the signal amplitude.

Now turning to FIG. 12, there is shown a specific embodiment of how the acoustic transducer arrangement of the present invention can be supported for passage through a borehole 80 for investigating a subsurface earth formation 81. Although not shown in FIG. 12, the conventional surface apparatus such as a drum and winch, signal processing circuits and a recorder are utilized for the usual purposes. Tthe investigating apparatus 82 includes a longitudinally extending support member 83 supported by a cable 83a for passage through the borehole 80. The central support member 83 includes two acoustic transmitters 84 and 85 arranged in accordance with a preferred embodiment of the present invention, i.e., these transmitters are hollow cylindrical tubes of the piezoelectrical type having their longitudinal axes perpendicular to the longitudinal axis of the support member 83. These transmitters 84 and 85 are placed in recessed 86 and 87 respectively which each have an opening to the mud within the borehole 80 along a generatrix of the support member. A perspective view of the transducer 84 in the recess 86 is shown in FIG. 13. Desirably, the distance between the transducer and wall of the recess is at least ½ times the wave length of the acoustic energy in the fluid in which the transducer is immersed to prevent reflected wave distortion of at least the first two half cylcles of the received signal.

The portion of the support member 83 between the two transmitters 84 and 85 is desirably constructed as a low pass filter having a cut-off frequency much lower than the main frequency of the transmitter thus attenuating and delaying acoustic energy attempting to pass along the support member. This can be accomplished with the teachings of copending patent application Ser. No. 256,074 (21.383) filed by J. C. Trouiller et al. on May 23, 1972.

Above the transmitter 84 and below the transmitter 85 are mounted offcentering means comprising two offcentering arms 88 and 89 equipped with spring blades 90 and 91 having sufficient stiffness to maintain the support member 83 offcentered in the borehole. As discussed in more detail in copending application Ser. No. 256,107 (21.377) filed by J. Planche on May 23, 1972, suitable hydraulic means are provided within the support member 83 for forcing the offcentering arms 88 and 89 into a closed position near the support member so as to allow descent of the investigating apparatus 82 through the borehole. These offcentering arms 88 and 89 are on the opposite side of the support member from the openings provided for the transmitting transducers 84 and 85 so that these transmitters will be near the borehole wall.

Located between the transmitters 84 and 85 and along the same generatrix as these transmitters is a pad 93 linked to the central support member 83 by a pair of arms 94 and 95. The arm 95 includes a spring 96 suitable for maintaining the pad 93 against the borehole wall. Located within the pad 93 are a pair of spaced-apart acoustic receivers 97 and 98 positioned in cavities 99 and 100. The receiving transducers 97 and 98 are cylindrical in shape with their axes parallel to the axes of the transmitting transducers 84 and 85. The cavities 99 and 100 have openings to the formation which are located along the same generatrix as the openings of the cavities 86 and 87. The backside of the pad is suitable constructed to prevent acoustic energy from reaching the acoustic receivers from this direction. At the upper and lower end of the pad 93 are pair of rotating wheels 103 and 104.

With the arrangement shown in FIG. 12, it can be seen that both the transmitters and receivers will be maintained a constant short distance from the wall of the boreholee. This is because of the standoffs 88, 89, 106 and 107 and because the springs 110 and 111 associated with the rotating wheels 106 and 107 are considerably stiffer than the springs 90 and 91 associated with the eccentering standoffs 88 and 89. Giving to such a constant standoff, the transmitter position in front of the borehole wall is constant and thus so is the acoustic path length in the mud. The amount of noise generated by the pad 93 moving along the borehole wall 80 is kept to a minimum because of the rotating wheels 106 – 107 and 103–104. Besides, as the support member structure operates as a low pass filter, the upper frequencies of the unavoidably generated noise do not reach the receivers through the support member body. Furthermore, to enhance the quality of the received signal, the electronics associated with each acoustic receiver can include a highpass filter with a cutoff frequency slightly below the lowest frequency of interest to the investigating system in order to fully suppress the lower frequencies of the noise.

It can be seen from the foregoing that an acoustic transducer array has been described which will improve the quality of measurements of formation acoustic properties. This has been accomplished by constructing and arranging one or more acoustic transducers so as to produce, for each transducer, a circular-arched directivity pattern over the region of interest. The region of interest is that portion or segment of the media surrounding the transducer which includes all the limit incidence angles determined by the ratio of mud to formation velocities and with which acoustic energy passes to the formation at the limit refraction angle. The advantages of the present invention will be best realized when all acoustic transducers are constucted and arranged in accordance with the present invention. However, an improvement over the prior art will occur even when only one transducer is so constructed and arranged and the invention is intended to cover this case also.

While ther has been described what is at present considered to be a preferred embodiment of this invention, it will be obvious to those skilled in the art that various changes and modifications may be made therein without departing from the invention and it is, therefore, intended to cover all such changes and modifications as fall within the true spirit and scope of the invention.

What is claimed is:

1. A structure adapted for use in investigating earth formations comprising:
   a. a longitudinally extending support member adapted for movement through a borehole; and
   b. transducer means adapted to be supported by said support member and having an energy responsive surface, a section of said surface of said transducer means defining a curved line along a plane which extends longitudinally and radially with reference to said longitudinally extending support member, said section being principally associated with energy directed generally radially thereto.

2. The structure of claim 1 wherein said section of said energy responsive surface of said transducer means is substantially convex.

3. The structure of claim 1 wherein said section of said energy responsive surface is substantially circular in cross section.

4. The structure of claim 1 wherein said transducer means is cylindrical in shape with the central axis of revolution of said cylindrical transducer means being substantially perpendicular to the longitudinally extending axis of said support member.

5. The structure of claim 1 wherein said transducer means is at least partially toroidal in shape with the central axis of revolution of said toroidally shaped transducer being substantially parallel to the longitudinally extending axis of said support member.

6. The structure of claim 1 wherein said transducer means is a plurality of cylindrical transducer segments arranged perpendicular to the longitudinally extending axis of said support member.

7. The structure of claim 1 wherein: said transducer means is eccentrically located in said support member near a portion of a borehole wall.

8. The structure of claim 1 wherein said structure includes a pad member which is supported by said support member, said transducer means being located in said pad member.

9. In acoustic apparatus for investigating earth formations traversed by a borehole, the combination comprising:
   a. A longitudinally extending support member adapted for movement through a borehole; and
   b. means supported by said support member for investigating an acoustic property of a formation, including acoustic transducer means adapted to be supported by said support member and having an energy responsive surface for emitting or receiving acoustic energy, a section of said surface of said transducer means defining a curved line along a plane which extends longitudinally and radially with reference to said longitudinally extending support member said section being principally associated with energy directed generally radially thereto.

10. The apparatus of claim 9 wherein said acoustic transducer means includes at least two acoustic transducers, the acoustic energy responsive surface of each of said transducers defining a curved line, convex towards a borehole wall along said plane.

11. The apparatus of claim 10 wherein said means for investigating an acoustic property of a formation includes means for energizing a first one of said transducers to emit acoustic energy into the media adjacent to said first transducer, a second one of said trans-ducers, operating in a receiving mode to produce an electrical signal representative of the acoustic energy which strikes said second transducer, whereby said produced electrical signal will be relatively unaffected by the particular value of the incidence angle of acoustic energy entering or leaving the borehole.

12. The apparatus of claim 11 wherein said apparatus includes a pad member supported by said support member and adapted to be pressed towards the borehole wall, and wherein said first transducer is eccentrically located in said support member and said second transducer is located in said member, said first and second transducers being eccentered from the center axis of the borehole towards a common generatrix of the borehole.

13. The apparatus of claim 12 wherein said apparatus includes a third transducer which operates in the receiving mode to produce another electrical signal, said third transducer being located in said pad member and eccentered from said center borehole axis towards said commonm generatrix.

14. A structure useful for investigating earth formations traversed by a borehole, comprising:
 a. a pad member adapted for movement in a direction parallel to the longitudinal axis of the borehole and having an axis parallel to said longitudinal axis;
 b. transducer means adapted to be supported by said pad member and having an energy responsive surface, a section of said surface of said transducer means defining a curved line, convex to a borehole wall portion, along a plane which extends longitudinally and radially with reference to said pad member axis, said section being principally associated with energy directed generally radially thereto.

15. The structure of claim 14 wherein said transducer means is cylindrical in shape with its center axis of revolution being perpendicular to said pad member axis.

16. A method of investigating earth formations traversed by a fluid-filled borehole, comprising:
 emitting acoustic energy at a first location in a borehole, receiving a portion of said emitted energy at a second location spaced from said location to produce an electrical signal reprsentative of said received energy, said emitted energy having a substantially circular shaped directivity pattern over a selected region surrounding said first location in a plane which extends substantially longitudinally and radially with reference to the borehole so that said produced electrical signal will be relatively unaffected by the particular value of the limit refraction angle for acoustic energy entering or leaving the borehole.

17. Apparatus for use in investigating earth formations comprising a support member adapted for movement through a borehole, and transducer means carried by said support member and having acoustic energy responsive surface means defining a curved line along a first plane substantially normal to said surface and parallel to the longitudinal extent of said support member, and defining a curved line along a second plane substantially perpendicular to said first plane and to the longitudinal extent to support member.

18. The apparatus of claim 17 in which said surface means defines a plurality of curved lines along said second plane.

19. The structure of claim 18 in which the curved lines in said second plane are substantially concentric.

20. A device for acoustically investigating earth formations traversed by a borehole containing a fluid, said device comprising a support member adapted for movement through a borehole, a plurality of emitter transducers carried by said support member creating pressure pulses in the fluid to excite elastic waves to propagate in the formation and being electrically connected in parallel for simultaneous operation, and a plurality of receiver transducers carried by said support member and spaced from said emitter transducers along the longitudinal extent of the borehole to receive pressure pulses in the fluid excited by said elastic waves and electrically connected in series to generate electric signals representative of the received pulses, at least one of said emitter and receiver transducers having an elastic energy responsive surface defining a curved line along a plane substantially normal to said surface and parallel to the longitudinal extent of said support member.

21. A device for acoustically investigating earth formations traversed by a borehole containing a fluid, said device comprising:
 an emitter transducer for creating pressure pulses in the fluid to excite elastic waves to propagate in the formation; and
 first and second receiving transducers spaced from said emitter transducer and from each other along the longitudinal extent of the borehole, to receive pressure pulses in the fluid excited by said elastic waves and to generate electric signals representative of the received pulses, each of said transducers having an elastic energy responsive surface defining a curved line along a plane substantially normal to said surface and parallel to the longitudinal extent of the borehole whereby the response of said receiving transducers to said pressure pulses excited by said elastic waves is substantially independent of the velocity of propagation of said elastic waves in the formation.

22. The apparatus of claim 17 in which said line curved along said second plane is curved about an axis of revolution substantially parallel to the longitudinal axis of said support member.

23. The apparatus of claim 17 in which said line curved along said second plane is curved about an axis of revolution coincident with the longitudinal axis of said support member.

* * * * *

UNITED STATES PATENT AND TRADEMARK OFFICE
CERTIFICATE OF CORRECTION

PATENT NO. : 3,978,939
DATED : September 7, 1976
INVENTOR(S) : Jean-Claude Trouiller It is certified that error appears in the above—identified patent and that said Letters Patent are hereby corrected as shown below:

Col. 2, line 10, "acousitc" should read -- acoustic --.
Col. 3, line 6, "form" should read -- from --.
Col. 4, line 43, "investigation" should read -- investigating --.
Col. 4, line 62, "th acoustic" should read -- the acoustic --.
Col. 5, lines 28 and 29, "elementary X, Y and Z" should read -- elementary areas X, Y and Z --.
Col. 6, line 8, "Fig. 3" should read -- Fig. 5 --.
Col. 8, line 51, "direction form" should read -- direction from --.
Col. 9, line 22, "Ths" should read -- The --.
Col. 10, line 29, "Tthe" should read -- The --.
Col. 10, line 39, "recessed" should read -- recesses --.
Col. 11, line 26, "boreholee" should read -- borehole --.
Col. 13, line 3, "trans-ducers" should read -- transducers --.
Col. 13, line 16, "said member" should read -- said pad member --.
Col. 13, line 24, "commonm" should read -- common --.
Col. 13, line 47, "said location" should read -- said first location --.
Col. 13, line 48, "reprsentative" should read -- representative --.

Signed and Sealed this

Twenty-eighth Day of December 1976

[SEAL]

Attest:

RUTH C. MASON
*Attesting Officer*

C. MARSHALL DANN
*Commissioner of Patents and Trademarks*